United States Patent

Watanabe et al.

[11] Patent Number: 4,951,198
[45] Date of Patent: Aug. 21, 1990

[54] FRICTION DETECTING DEVICE FOR VEHICLES

[75] Inventors: Kenichi Watanabe; Akihiko Miyoshi; Shoichi Kamimura, all of Hiroshima, Japan

[73] Assignee: Mazda Motor Corporation, Hiroshima, Japan

[21] Appl. No.: 260,890

[22] Filed: Oct. 14, 1988

[30] Foreign Application Priority Data

| Oct. 15, 1987 | [JP] | Japan | 62-260451 |
| Oct. 15, 1987 | [JP] | Japan | 62-260454 |
| Oct. 15, 1987 | [JP] | Japan | 62-260456 |
| Oct. 15, 1987 | [JP] | Japan | 62-260457 |
| Oct. 15, 1987 | [JP] | Japan | 62-260458 |

[51] Int. Cl.$^5$ .................................... B62D 6/04
[52] U.S. Cl. .................... 364/424.05; 180/140; 180/141
[58] Field of Search ............ 364/424.05, 424.01; 180/140, 141, 142; 280/707

[56] References Cited

U.S. PATENT DOCUMENTS

| 3,866,706 | 2/1975 | Linke et al. | 180/142 |
| 4,706,771 | 11/1987 | Kawabe et al. | 180/142 |
| 4,733,878 | 3/1988 | Kanazawa et al. | 280/91 |
| 4,773,012 | 9/1988 | Ito et al. | 364/424.01 |
| 4,806,627 | 2/1989 | Yasuike et al. | 364/424.05 |
| 4,807,128 | 2/1989 | Ikemoto et al. | 364/424.05 |

Primary Examiner—Thomas G. Black
Attorney, Agent, or Firm—Fleit, Jacobson, Cohn, Price, Holman & Stern

[57] ABSTRACT

A friction detecting device comprising running condition detector for detecting a running condition of a vehicle including a lateral acceleration acting on a gravity center of the vehicle, steering angle detector for detecting steering angle of front and rear wheels of the vehicle, vehicle speed sensor, memory for storing stability factors of the vehicle including a vehicle weight, respective distances between the gravity center and front and rear axles, cornering powers acting on the front and rear wheels at a standard condition and a yawing moment of inertia, control unit for obtaining a frictional coefficient $\mu$ of a road surface on which the vehicle is running by employing a following formula;

$$\mu = [V\{m(a^2 K_F + b^2 K_R) + IK\}s - mV^2(aK_F - bK_R)] / a_y/2cK_F K_R \{V(b\delta_F + a\delta_R)s + V^2(\delta_F - \delta_R) - ca_y\}$$

wherein $a_y$ is the lateral acceleration acting on the gravity center of the vehicle, $\delta_F$ is the steering angle of the front wheels, $\delta_R$ is the steering angle of the rear wheels, V is the vehicle speed, m is the vehicle weight, a is the distance between the gravity center of the vehicle and the front axle, b is the distance between the gravity center of the vehicle and the rear axle, $K_F$, $K_R$ are the cornering powers for the front and rear wheels at the standard condition, I is the yawing moment of inertia of the vehicle, $c = a + b$, $K = K_F + K_R$ and s is a laplacian operator.

13 Claims, 15 Drawing Sheets

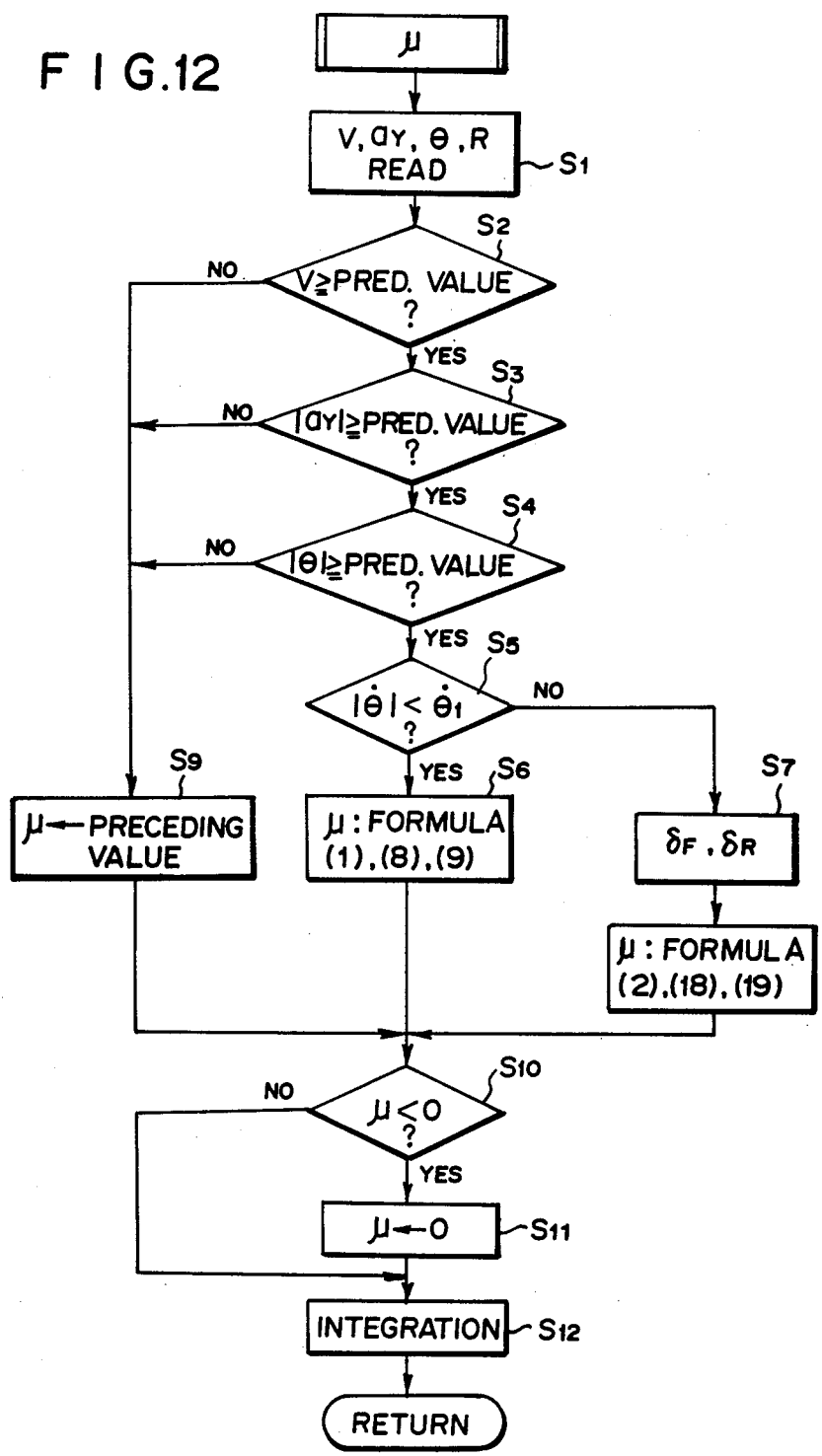

FRICTION DETECTING DEVICE FOR VEHICLES

BACKGROUND OF THE INVENTION

1. Field of the Invention

The present invention relates to a friction detecting device for vehicles, particularly to a device for detecting a frictional coefficient between vehicle wheels and a road on which the vehicle runs, more specifically to a device for detecting a dynamic frictional coefficient which changes in accordance with vehicle operating condition.

2. Description of the Prior Art

There has been proposed a friction detecting device for detecting a frictional coefficient between vehicle wheels and a road surface and controlling a steering of a vehicle in accordance with a result of the detection because a frictional force between the wheels and the road surface affects a vehicle driving property significantly.

Japanese patent public disclosure No. 59-148769 discloses a vehicle steering system including a device for setting plural values of frictional coefficient between vehicle wheels and a road surface in accordance with a steering angle for front wheels, calculating lateral accelerations against the vehicle corresponding to the values of the frictional coefficient, comparing the calculated values of the lateral acceleration with an actual value of the lateral acceleration detected, presuming a fictional coefficient corresponding to a calculated value of the lateral acceleration closest to the actual value of the lateral acceleration detected as a desirable frictional coefficient, and carrying out a steering control taking account of the desirable frictional coefficient.

It should however be noted that the steering system disclosed in the above Japanese application does not consider a dynamic property or a transient response property such as a vehicle lateral acceleration and a yawing rate produced in the vehicle which are changed in accordance with a steering amount applied to the vehicle wheels, and that the steering system has nothing but the way to presume the frictional coefficient constant. Therefore, although the steering system can infer the frictional coefficient precisely when the steering angle is constant, for instance, the vehicle runs on a true circular path, as a matter of fact, it is unlikely that the vehicle runs frequently with a constant steering angle. Thus, the steering system as disclosed in the Japanese patent public disclosure No. 59-148769 cannot get a precise value of the frictional coefficient actually so that it is difficult to accomplish a desirable and precise steering control in accordance with the vehicle operating condition.

U.S. Pat. No. 4,733,878 owned by the same assignee as the present application discloses a four wheel steering control system in which a steering ratio of the rear wheel steering angle to the front wheel steering angle is controlled to a same phase direction when the frictional coefficient is small. In this patent, the frictional coefficient is obtained through a similar procedure to the Japanese public disclosure No. 59-148769 so that the dynamic property of the vehicle or the transient property is not taken into account for the control. This means that the control disclosed in the U.S. Patent has the same problem as the Japanese application aforementioned.

SUMMARY OF THE INVENTION

It is therefore an object of the present invention to provide a friction detecting device which can detect precisely a frictional coefficient between vehicle wheels and a road surface on which a vehicle runs in accordance with a change in a steering amount applied to the vehicle wheels during a vehicle steering operation.

It is another object of the present invention to provide a friction detecting device which can detect a dynamic frictional coefficient which changes in accordance with a dynamic property of the vehicle such as a yawing rate and a lateral acceleration of the vehicle.

It is still another object of the present invention to provide a vehicle steering control system provided with a friction detecting device for detecting the dynamic frictional coefficient so as to accomplish an improved steering control of the vehicle.

The above and other object of the present invention can be accomplished by a friction detecting device comprising running condition detecting means for detecting a running condition of a vehicle including a lateral acceleration acting on a gravity center of the vehicle, steering detecting means for detecting steering angle of front and rear wheels of the vehicle, vehicle speed detecting means for detecting a vehicle speed, memory means for storing stability factors of the vehicle including a vehicle weight, respective distances between the gravity center and front and rear axles, cornering powers acting on the front and rear wheels at a standard condition and a yawing moment of inertia, and calculating means for calculating a frictional coefficient of a road surface on which the vehicle is running by employing a following formula;

$$\mu = [V\{m(a^2 K_F + b^2 K_R) + IK\}s - mV^2(aK_F - bK_R)]a_Y / 2cK_F K_R \{V(b\delta_F + a\delta_R)s + V^2(\delta_F - \delta_R) - ca_Y\} \quad (1)$$

Wherein $a_Y$ is the lateral acceleration acting on the gravity center of the vehicle, $\delta_F$ is the steering angle of the front wheels, $\delta_R$ is the steering angle of the rear wheels, V is the vehicle speed, m is the vehicle weight, a is the distance between the gravity center of the vehicle and the front axle, b is the distance between the gravity center of the vehicle and the rear axle, $K_F$, $K_R$ are the cornering powers for the front and rear wheels at the standard condition, I is the yawing moment of inertia of the vehicle, $c = a + b$, $K = K_F + K_R$ and s is a laplacian operator.

The above formula can be introduced from the following equation of motions which are obtained from a balance of forces acting on the wheels;

$$ma_Y = 2F_F + 2F_R \quad (3)$$

$$I\dot{\gamma} = 2aF_F - 2bF_R \quad (4)$$

$$F_F = \mu K_F(\delta_F - \beta - a\gamma/V) \quad (5)$$

$$F_R = \mu K_R(\delta_R - \beta + b\beta/V) \quad (6)$$

Wherein $V = (\dot{\beta} = \gamma) = a_Y$, $F_F$, $F_R$ are respectively cornering forces for the front and rear wheels and is a yawing rate of the vehicle. From the equations (3) through (6), eliminating $F_F$, $F_R$, $\beta$, $\gamma$, and $\dot{\gamma}$, the following equation is obtained;

$$[MiV^2 s^2 + 2\mu V\{m(a^2 K_F + b^2 K_R) + IK\}s + 4c^2 K_F K_R \mu - 2\mu m V^2(aK_F - bK_R)]a_Y = 2\mu IV^2(K_F \delta_F + K_R \delta_R)s^2 + 4\mu^2 V K_F K_R c(b\delta_F$$

$$+a\delta_R)s+4\mu^2V^2K_FK_{Rc}(\delta_F-\delta_R) \quad (7)$$

In this equation, terms of $s^2$ are high-frequency components of the transient response so that they are usually negligible. Then, both sides of the equation could be divided by $\mu$. Thus, the above formula (1) can be obtained.

Then, by multiplying s to both the numerator and the denominator, the following formula for providing another $\mu$ can be obtained.

$$\mu=\frac{[V\{m(a^2K_F+b^2K_R)+IK\}s-mV^2(aK_F-bK_R)]}{\dot{a}_Y/2cK_FK_R\{V(b\dot{\delta}_F+a\dot{\delta}_R)s+V^2(\delta_F-\delta_R)-c\dot{a}_Y\}} \quad (2)$$

According to the present invention, the frictional coefficient of the road surface $\mu$ can be obtained precisely through the above formulas (1) and (2) so that a desirable steering control can be accomplished in accordance with the vehicle driving condition, specifically a cornering operation and an operation in a snowy road.

In this case, the formula (1) is usually employed for calculating the frictional coefficient $\mu$ and the formula (2) is employed under a specific operating condition.

The above and other objects of the present invention will be apparent from the following descriptions of preferred embodiments taking reference with the accompanying drawings.

BRIEF DESCRIPTION OF THE DRAWINGS

FIG. 12 is a flow chart showing a procedure similar to FIG. 5 but in accordance with further another embodiment of the present invention;

DESCRIPTION OF THE PREFERRED EMBODIMENTS

Figure 1:
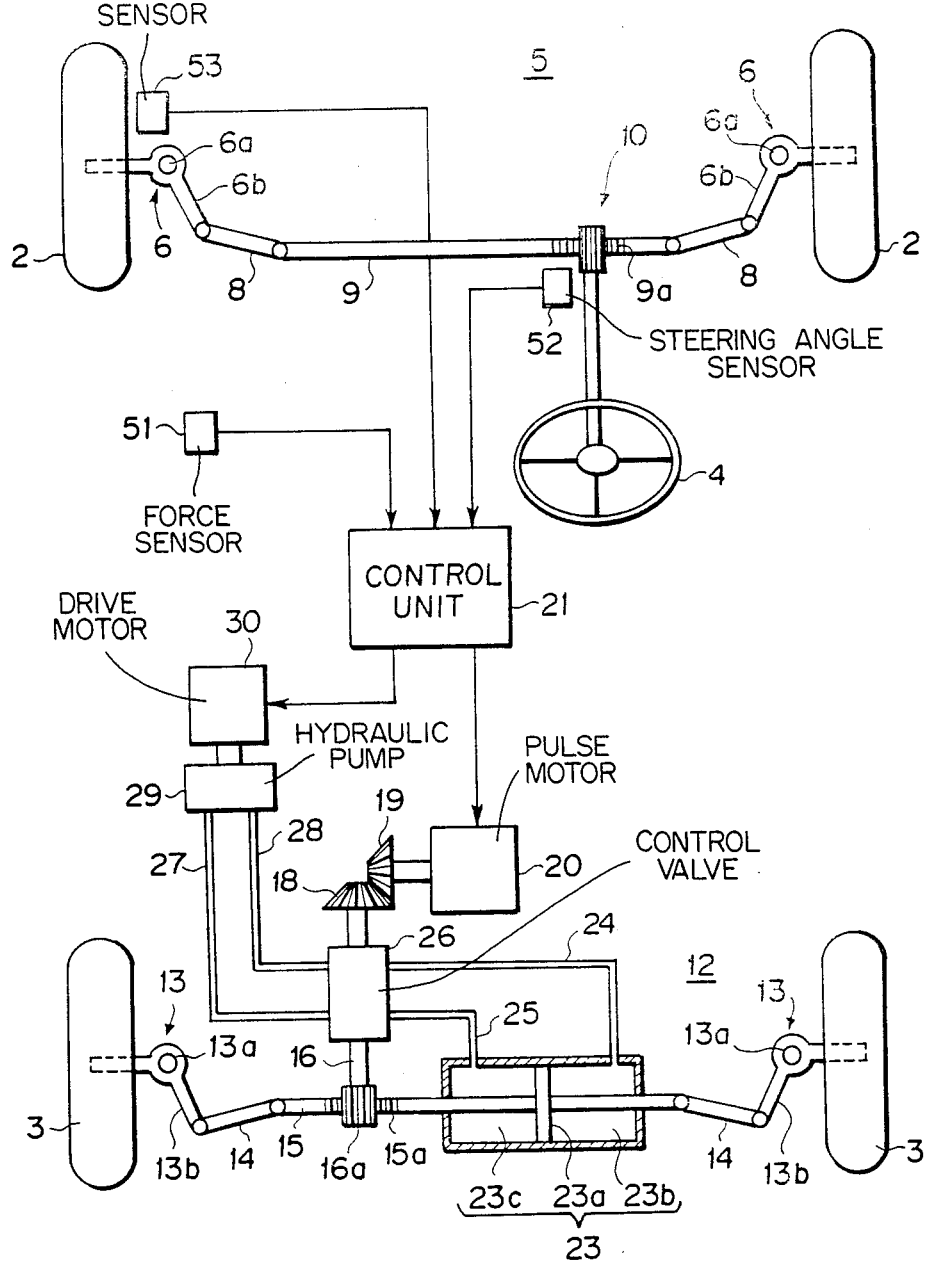
FIG. 1 is a schematic view of a four wheel steering mechanism to which a friction detection device in accordance with the present invention can be applied.

Referring to the drawings, specifically to FIG. 1, there is shown a schematic view of a four wheel steering system to which the present invention can be preferably applied. The four wheel steering system is adapted to steer not only front wheels 2, 2 but also rear wheels 3, 3. For this purpose, the four wheel steering system is provided with a front wheel steering mechanism 5 for steering the front wheels 2,2 by controlling a steering angle $\delta_F$ for the front wheels 2,2. The front wheel steering mechanism 5 is provided with a pair of knuckle members 6,6 carried by a vehicle body through a joint portion 6a which rotatably carries the front wheels 2,2, a pair of tie rods 8,8 connected with knuckle arms 6b, 6b at one ends respectively, a rack member 9 connects with the other ends of the tie rods 8,8 at the opposite end thereof, and a steering gear mechanism for transmitting a rotative movement of a steering wheel 4 to the rack member 9 as a reciprocative movement of thereof through a commonly used pinion and rack mechanism (not shown).

A steering angle $\Theta$ for the steering wheel 4 produces a front wheel steering wheel angle $\delta_F$ in accordance with a front gear ratio $Z=\Theta/\delta_F$.

There is provided a rear wheel steering mechanism 12 for steering the rear wheels 3,3 in accordance with the steering movement of the front wheels 2,2. The rear wheel steering mechanism 12 is provided with a pair of knuckle members 13, 13, tie rods 14, 14 and a rack member 15, a pinion shaft 16 of which a pinion portion 16a at the tip end is engaged with a rack portion 15a, a bevel gear 18 mounted at the other end of the pinion shaft 16, and a pulse motor 20 comprising a bevel gear 19 in a meshing contact with the bevel gear 18.

The pulse motor 20 is actuated by a control unit 21 so that a rotative driving force of the pulse motor 20 is transmitted to the rack member 15 as a reciprocative movement thereof.

In addition, on the rack member 15 of the rear wheel steering mechanism 12 is mounted a power cylinder 23 for assisting the reciprocative movement of the rack member 15. The power cylinder 23 is provided with a piston 23a integrally connected on the rack member 15. An inside space of the cylinder 23 is divided by the piston 23a to define hydraulic chambers 23b and 23c which are communicated with a control valve 26 through hydraulic passages 24, 25. The control valve 26 is communicated with a hydraulic pump 29 driven by a drive motor 30 through a supply passage 27 and return passage 28.

The control valve 26 controls a supply of the hydraulic pressure for the hydraulic chambers 23b, 23c in accordance with the rotative movement of the pinion shaft 16. The rack member 15 is displaced transversely by the pulse motor 20 so that the control valve 26 controls the communication between the supply and return passages 27, 28 and hydraulic passages 24, 25 to control the hydraulic pressure for the hydraulic chambers 23b, 23c to thereby assist the transverse movement of the rack member 15 providing a predetermined rear wheel steering angle $\delta$ of the rear wheels.

Figure 2:
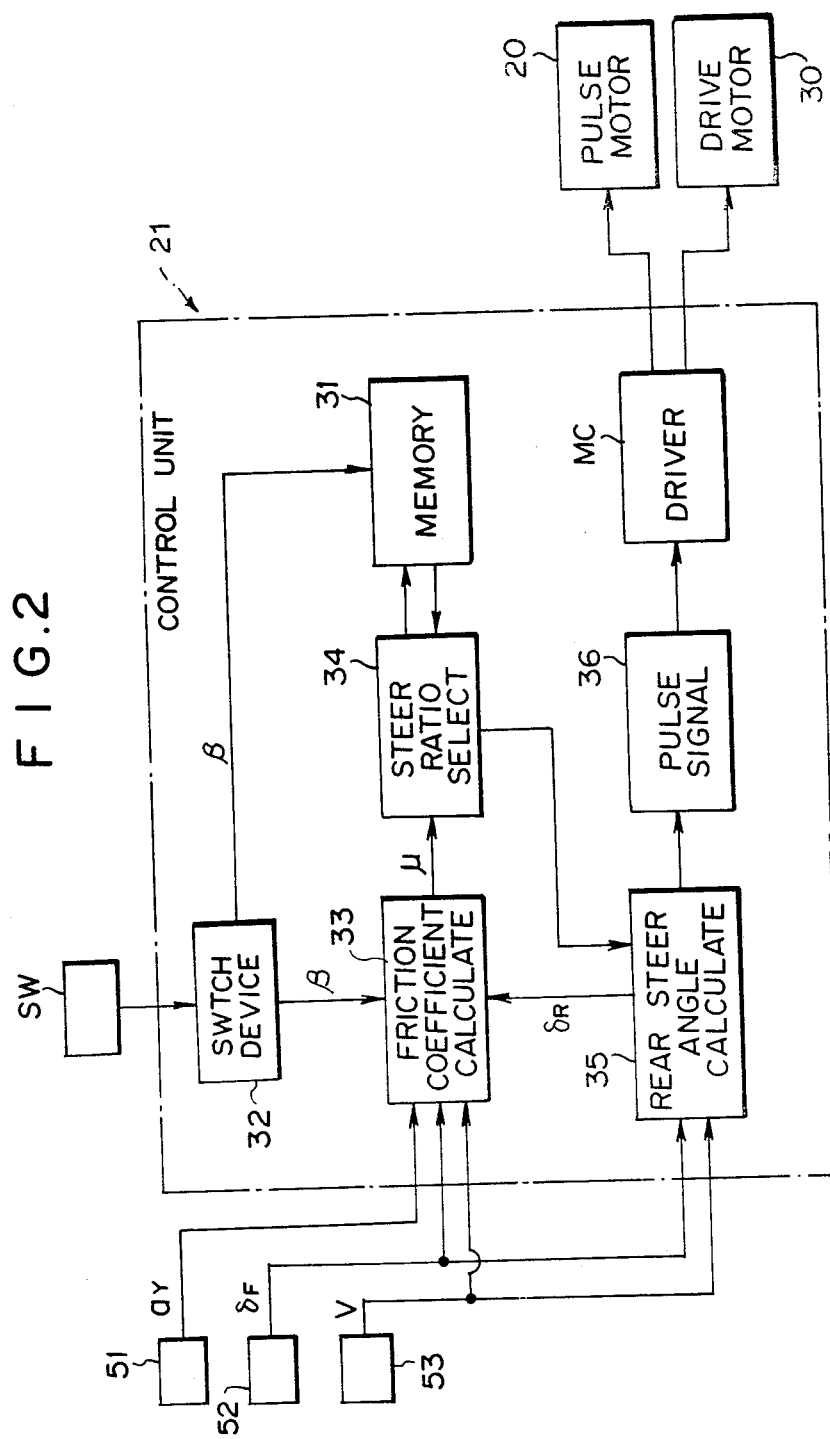
FIG. 2 is a block chart of a control unit for detecting a frictional coefficient and carrying out a steering control.

Referring to FIG. 2 in addition to FIG. 1, The control unit receives signals from a side force sensor 51 for detecting a lateral acceleration $a_Y$ based on a side force acting on the vehicle body during a cornering operation of the vehicle, a steering angle sensor 52 for detecting a front wheel steering angle $\delta_F$ based on the front gear ratio Z in accordance with the steering angle $\Theta$ in the steering wheel 4 and a vehicle speed sensor 53 for detecting a vehicle speed V based on a rotation speed of the front wheel 2.

The control unit 21 is provided with a memory 31 for storing stability factors such as a vehicle weight m, a distance between a gravity center of the vehicle and a front axle a, a distance between the gravity center of the vehicle and a rear axle b, cornering powers $K_F$, $K_R$ for the front and rear wheels 2, 3 respectively in a standard condition, a yawing moment of inertia I of the vehicle, a frictional coefficient $\mu$ between the wheels 2, 3 and a road surface on which the vehicle is running, and a steering ratio property. The control unit 21 is also provided with a switching device 32 for receiving a signal from an external switch SW which detects whether or not a steering control provides a value of a side slip angle of the vehicle $\beta$ with zero and for switching a formula by which the frictional coefficient $\mu$ obtained as a result of the detection of the external switch SW, a processing section 33 for calculating the frictional coefficient $\mu$ by employing the formula selected by the switching device 32, a steering ratio selecting section 34 for selecting a desirable steering ratio property in accordance with an output from the processing section 33, a rear wheel steering angle processing section 35 for calculating a rear wheel steering angle $\delta_R$ obtained from a steering ratio $R=\delta_R/\delta_F$ determined based on the steering ratio property selected by the selecting section 34, a pulse signal forming section 36 for receiving signals from the rear wheel steering section 35 to form a pulse signal which is employed for driving the pulse motor 20 and the drive motor 30 and a driving section MC for driving the pulse motor 20 and the drive motor 30. The steering angle sensor 52 and the rear wheel steering angle processing section 35 constitute steering condition detecting means.

The memory stores formulas for obtaining the frictional coefficient $\mu$.

Figure 3:
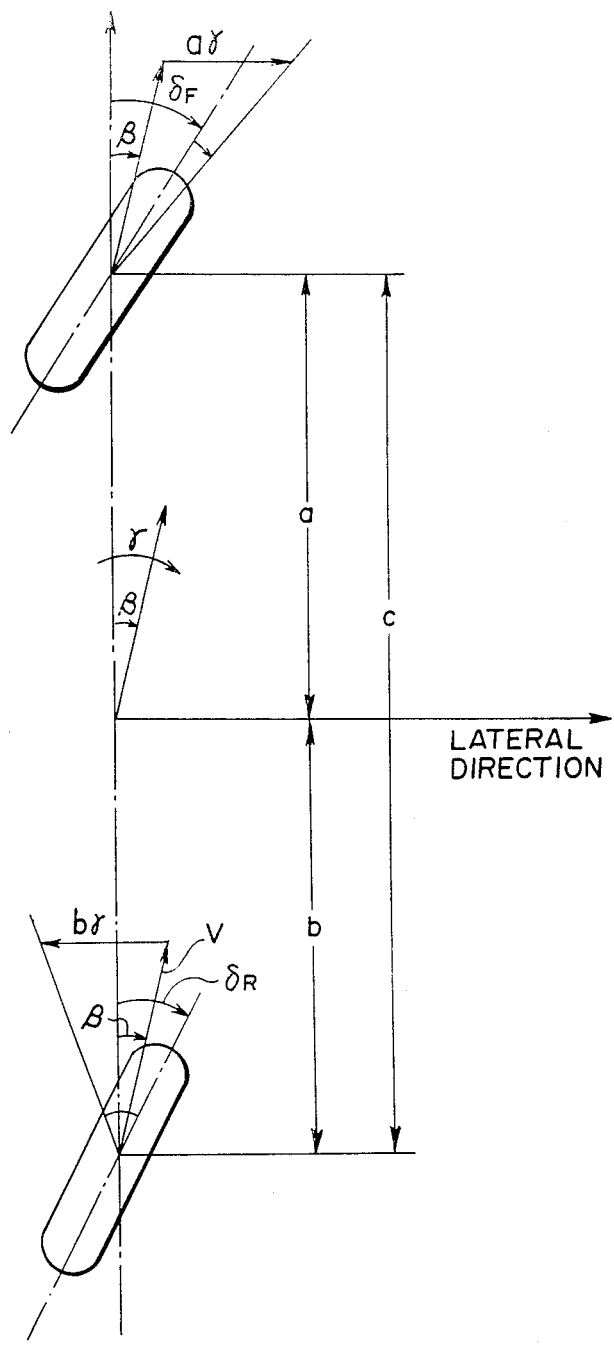
FIG. 3 is a view showing forces acting on the wheels of the vehicle.

The frictional coefficient $\mu$ can be obtained from the following basic equations of motions which are obtained from a balance of forces acting on the wheels as shown in FIG. 3;

$$ma_Y = 2F_F + 2F_R \quad (3)$$

$$I\dot{\gamma} = 2aF_F - 2bF_R \quad (4)$$

$$F_F = \mu K_F(\delta_F - \beta - a\gamma/V) \quad (5)$$

$$F_R = \mu K_R(\delta_R - \beta + b\beta/V) \quad (6)$$

Wherein $V=(\dot{\beta}+\gamma)=a_Y$, $F_F$, $F_R$ are respectively cornering forces for the front and rear wheels and is a yawing rate of the vehicle. From the equations (3) through (6), eliminating $F_F$, $F_R$, $\beta$, $\gamma$, and $\dot{\gamma}$, the following equation is obtained;

$$[MiV^2s^2 + 2\mu V(a^2K_F+b^2K_R)+IK]s \\ +4c^2K_FK_R\mu - 2\mu mV^2(aK_F-bK_R)]a_Y \\ = 2\mu IV^2(K_F\delta_F+K_R\delta_R)s^2 + 4\mu^2VK_FK_Rc\ (b\delta_F \\ +a\delta_R)s + 4\mu^2V^2K_FK_Rc(\delta_F-\delta_R) \quad (7)$$

In this equation, terms of $s^2$ are high-frequency components of the transient response so that they are usually negligible. Then, both sides of the equation could be divided by $\mu$. Thus, the following formula can be obtained;

$$\mu = [V\{m(a^2K_F+b^2K_R) + IK\}s - mV^2(aK_F-bK_R)] \\ a_Y/2cK_FK_R\{V(b\delta_F+a\delta_R)s + V^2(\delta_F-\delta_R) - ca_Y\} \quad (1)$$

Wherein $a_Y$ is the lateral acceleration acting on the gravity center of the vehicle, $\delta_F$ is the steering angle of the front wheels, $\delta_R$ is the steering angle of the rear wheels, V is the vehicle speed, m is the vehicle weight, a is the distance between the gravity center of the vehicle and the front axle, b is the distance between the gravity center of the vehicle and the rear axle, $K_F$, $K_R$ are the cornering powers for the front and rear wheels at the standard condition, I is the yawing moment of inertia of the vehicle, $c=a+b$, $K=K_F+K_R$ and s is a laplacian operator.

When the vehicle is of a four wheel steering system, the side slip angle of the vehicle $\beta$ can be set as zero. Thus, the following formula can be obtained from the formulas (3)–(7) by introducing zero into the side slip angle of the vehicle $\beta$;

$$\mu = ma_Y/2\{K_F\delta_F+K_R\delta_R-(a_Y/V^2)(aK_F-bK_R)\} \quad (8)$$

In the above formula (8), the front wheel steering angle $\delta^F$ be expressed by the steering wheel operation angle $\Theta$ and the front gear ratio Z, likewise, the rear wheel steering angle can be expressed by the steering ratio R so that the formula (8) can be expressed as follows:

$$\mu = ma_Y/2\{(K_F+RK_R)(\Theta/Z)-(a_Y/V^2) \\ (aK_F-bK_R)\} \quad (9)$$

Figure 4:
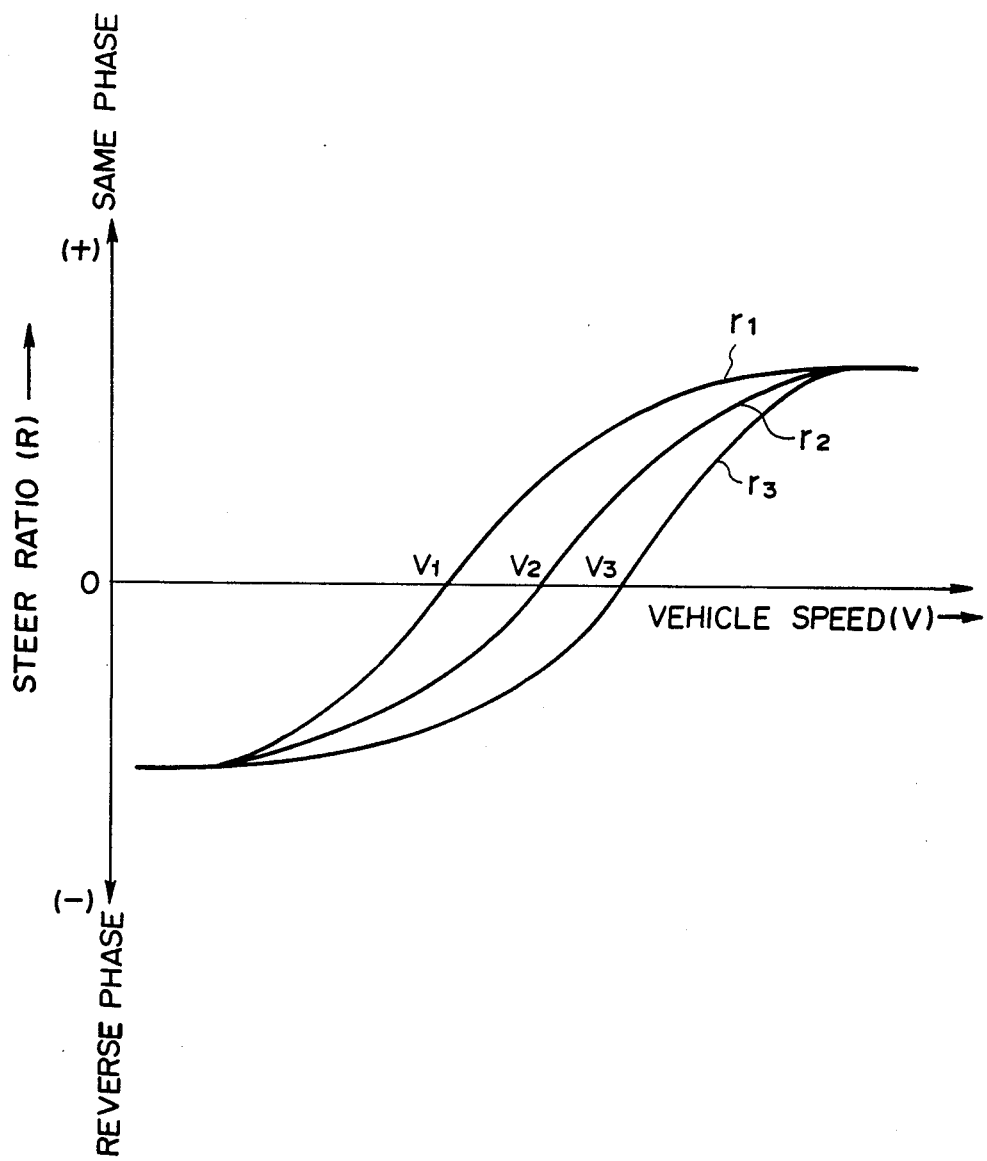
FIG. 4 is a graph showing properties of steering ratio in various frictional coefficient $\mu$.

The memory 31 stores a plurality of steering ratio properties as shown in FIG. 4 in accordance with the values of the frictional coefficient $\mu$. It will be understood from FIG. 4 that the values of the steering ratio R changes continuously from a reverse phase wherein the rear wheels 3,3 are steered in a direction opposite to a direction in which the front wheels 2,2 are steered to a same phase wherein the rear wheels 3,3 are steered in a same direction as the front wheels 2,2 as the vehicle speed V is increased. According to the illustrated example, as the values of the frictional coefficient $\mu$ is increased, respective steering properties r1, r2 and r3 are provided. The respective steering properties r1, r2 and r3 have respective critical vehicle speeds V1, V2 and V3 at which the steering direction of the rear wheels changes from the reverse phase to the same phase wherein there is a relationship between them as V1<V2<V3 as shown in FIG. 4. This means that the critical value of the vehicle speed V is increased as the frictional coefficient $\mu$ increases.

Figure 5:
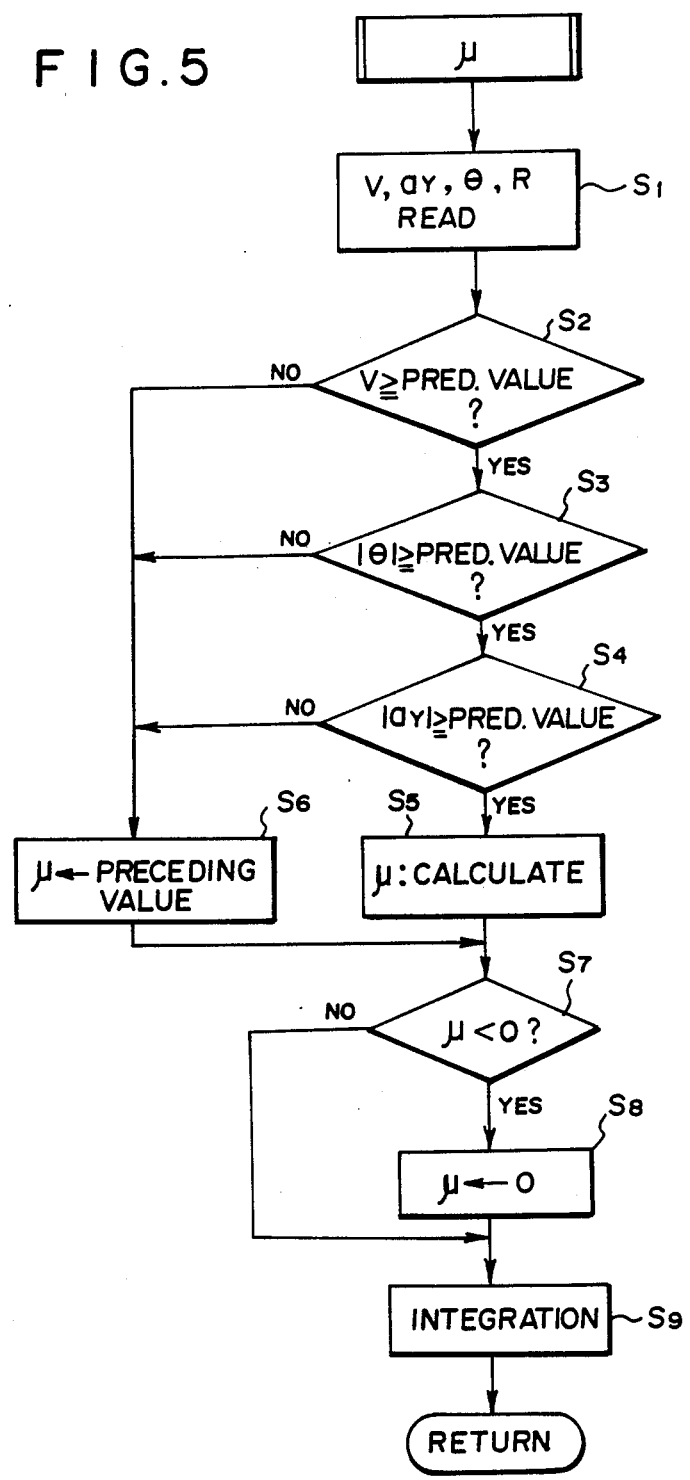
FIG. 5 is a flow chart showing a procedure in the control unit for obtaining the frictional coefficient $\mu$.

Hereinafter, there is described a procedure for obtaining the frictional coefficient $\mu$ in the processing section 33 of the control unit 21 taking reference to FIG. 5.

The control unit 21 at first reads the signals denoting the vehicle speed V, the lateral acceleration $a_Y$, the steering wheel operation angle $\Theta$ and steering ratio R from the vehicle speed sensor 53, the side force sensor 51, the steering angle sensor 52 and the rear wheel steering angle section 35 (S1). Then the control unit 21 judges whether or not the value of the vehicle speed V, the lateral acceleration $a_Y$, the steering wheel operation angle $\Theta$ and the steering ratio R are not smaller than predetermined values respectively(S2,S3, and S4). If all the judgments are Yes, the control unit 21 calculates the frictional coefficient $\mu$ by employing the formulas (1), (8) or (9) in step S5. If one or more judgment in steps S2, S3 and S4 is No, the control unit 21 employs a value of the frictional coefficient $\mu$ obtained in the preceding cycle without calculating the frictional coefficient $\mu$ in step 5. This is because a value of the denominator in the formulas (1), (8) and (9) approaches to zero causing an increase of error in the frictional coefficient $\mu$. Then, in step 7, the control unit 21 judges the value of the frictional coefficient $\mu$ and resets the value at $\mu=0$ when the sign is minus (S7 and S8). In next step S9, the control unit 21 calculates an integrated frictional coefficient $\mu'$ based on the following formula;

$$\mu' = \mu(1+\tau \cdot s) \qquad (11)$$

Wherein $\tau$ is a time constant and s is the laplacian operator. The value $\mu'$ can be employed for the steering control of the vehicle in lieu of the value $\mu$ so that a better control can be accomplished. Hereinafter, there is described a procedure for obtaining the value $\mu'$.

The formula (11) can be converted to a formula (13) using a formula (12).

$$s = (2/T)\{(1-Z)/(1+Z)\} \qquad (12)$$

$$\mu'/\mu = (1+Z)/\{(1+Z)+\alpha(1-Z)\} \qquad (13)$$

Wherein T is a sampling time and $\alpha = 2\tau/T$.

Then differential equations can be obtained as follows;

$$y'(n) = \{\mu(n)+(\alpha-1)y'(n-1)\}/(\alpha+1) \qquad (14)$$

$$\mu'(n) = y'(n) + y'(n-1) \qquad (15)$$

Further, the following formula can be obtained corresponding to the formula (14).

$$Y_1 = \{\mu + (\alpha-1)Y_0\} \qquad (16)$$

Wherein $Y_0$ and $Y_1$ are calculation values in the preceding and present cycles respectively.

After obtaining the value of $Y_1$, the value $\mu'$ can be obtained from the following formula;

$$\mu' = Y_0 + Y_1 \qquad (17)$$

As aforementioned, when the vehicle is in a cornering operation, the control unit 21 receives signals from the sensors 51-53 and calculates the frictional coefficient $\mu$ based on the formulas (1), (8), or (9) at the processing section 33. Then the unit 21 selects a steering ratio property among the properties r1, r2, and r3 which are stored in the memory 31 based on the result of the calculation of the frictional coefficient $\mu$ ( preferably the integrated frictional coefficient $\mu'$). Thereafter, the value of the rear wheel steering angle $\delta_R$ is obtained based on values of the front wheel steering angle $\delta_F$ detected from the steering angle sensor 52, the vehicle speed V detected by the vehicle speed sensor 53. The pulse signal forming section 36 produces a pulse signal in accordance with the value of the rear wheel steering angle $\delta_R$ and the driving section MC actuates the pulse motor 20 and the drive motor 30 so that the rear wheels 3,3 are steered to get the steering angle $\delta_R$.

According to the above control, the frictional coefficient $\mu$ can be obtained responsively and precisely in accordance with the driving condition of the vehicle. In addition, by integrating the frictional coefficient $\mu$ in the step 9, a leveled value of the frictional coefficient $\mu$ can be obtained to provide a stable cornering operation.

The present invention can be applied for not only the control for the four wheel steering system but also two wheel steering mechanism. For example, the present invention can be applied for anti-lock braking system wherein the frictional coefficient $\mu$ is employed for controlling a braking system so that a braking effect can be improved. Although the formula (1) for providing the frictional coefficient $\mu$ can be expressed as follows;

$$\mu = G(s)a_Y/H(s)\Theta$$

,by using the yawing rate , it can be expressed as follows;

$$\mu = G'(s)/H(s)\Theta$$

or by using the side slip angle $\beta$, $$\mu = G''(s)\beta/H(s)\Theta.$$

Hereinafter, there is described another embodiment of the present invention.

In this embodiment, the frictional coefficient $\mu$ is provided by the following formula (2) under such a specific vehicle operation condition that an error of the calculated frictional coefficient $\mu$ might be increased seriously;

$$\mu = [V\{m(a^2K_F+b^2K_R)+IK\}s - mV^2(aK_F-bK_R)] \\ a_Y/2cK_FK_R\{V(b\delta_F+a\delta_R)s + V^2(\delta_F-\delta_R)-ca_Y\} \qquad (2)$$

The above formula can be obtained by multiplying s to both the numerator and the denominator of the formula (1).

Figure 6:
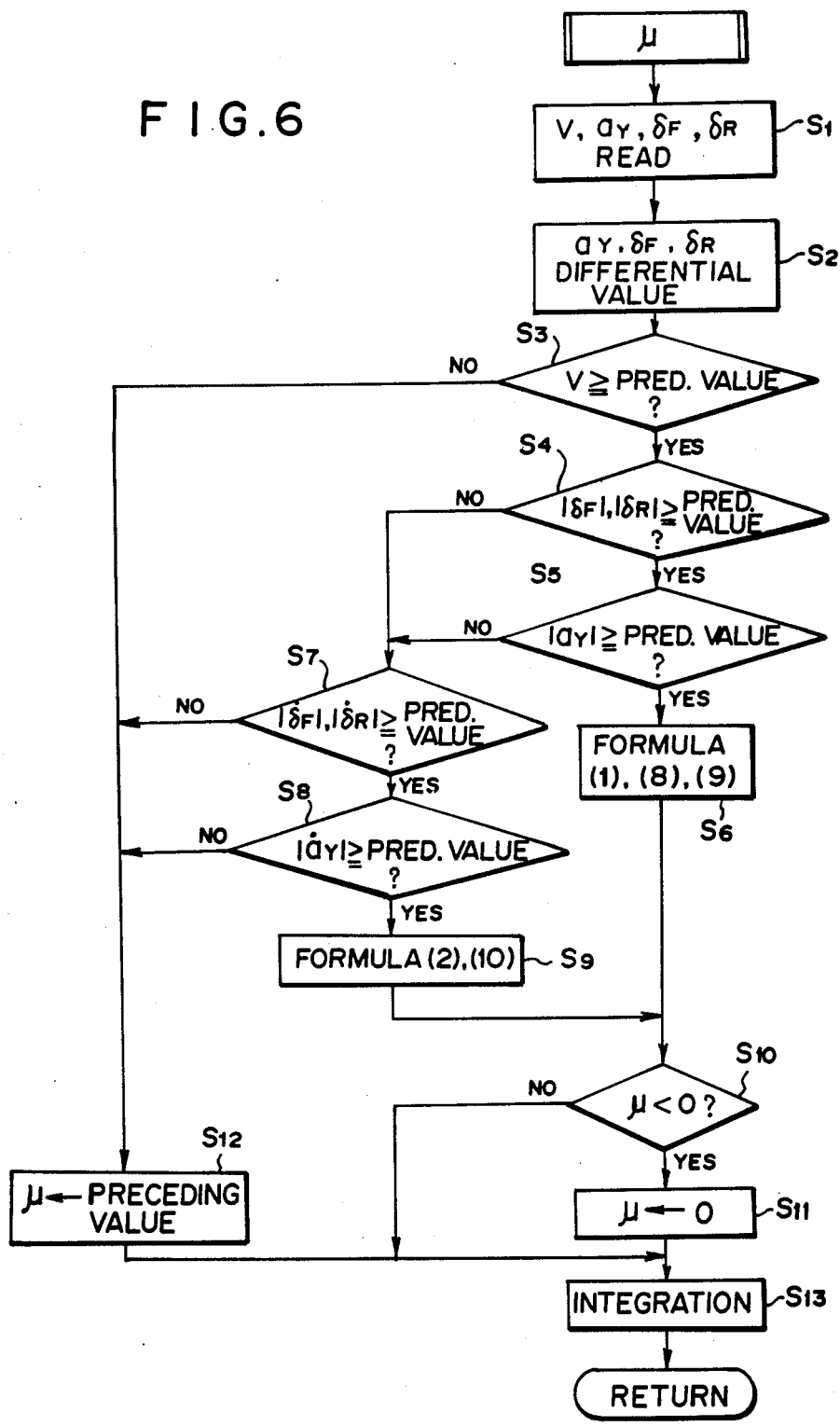
FIG. 6 is a flow chart showing a procedure similar to FIG. 5 but in accordance with another embodiment of the present invention.

Referring to the FIG. 6, there is shown a flow chart of a procedure for obtaining the frictional coefficient $\mu$ in accordance with the illustrated embodiment. The control unit 21 at first reads the signals denoting the vehicle speed V, the lateral acceleration $a_Y$, the steering wheel operation angle $\Theta$, the front wheel steering angle $\delta_F$ and the rear wheel steering angle $\delta_R$ from the vehicle speed sensor 53, the side force sensor 51, the steering angle sensor 52 and the rear wheel steering angle section 35 (S1). In step 2, the control unit 21 calculates differential values of $a_Y$, $\delta_F$ and $\delta_R$. Then the control unit 21 judges whether or not the value of the vehicle speed V, the lateral acceleration $a_Y$, the steering wheel operation angle $\Theta$ and the steering ratio R are not smaller than predetermined values respectively(S3,S4, and S5). If all the judgments are Yes, the control unit 21 judges the vehicle operating condition is normal and calculates the frictional coefficient $\mu$ by employing the formulas (1), (8) or (9) in step S6. If one or more judgment in steps S3, S4 and S5 is No, the control unit 21 in turn find a specific operating condition wherein a value of the denominator in the formulas (1), (8) and (9) approaches to zero causing an increase of error in the frictional coefficient $\mu$. In this case, the control unit 21 judges whether or not the differential values $\delta_F$, $\delta_R$, and $a_Y$ are not more than predetermined values (S7, S8). If both the judgments in S7 and S8 are Yes, the control unit 21 calculates the frictional coefficient $\mu$ based on the formula (2) of the following formula;

$$\mu = ma_Y/2\{(K_F+RK_R)(\Theta/Z)-(a_Y/V^2) \\ (aK_F-bK_R)\} \qquad (10)$$

This formula (10) can be obtained from the formula (9) by multiplying the laplacian operator s to both the numerator and denominator.

Then, in step 10, the control unit 21 judges the value of the frictional coefficient $\mu$ and resets the value at $\mu=0$ when the sign is minus (S11). If the values of the vehicle speed V, the differential value of the front and rear wheel steering angles $\delta_F$, $\delta_R$ are smaller than predetermined value, the control unit 21 employs a value of the frictional coefficient $\mu$ obtained in the preceding calculation cycle without calculating the frictional coefficient $\mu$ in step 6 or 9. In next step S13, the control unit 21 calculates an integrated frictional coefficient $\mu'$ as well as the former embodiment. The value $\mu'$ can be employed for the steering control of the vehicle in lieu of the value $\mu$ so that a better control can be accomplished.

Figure 7:
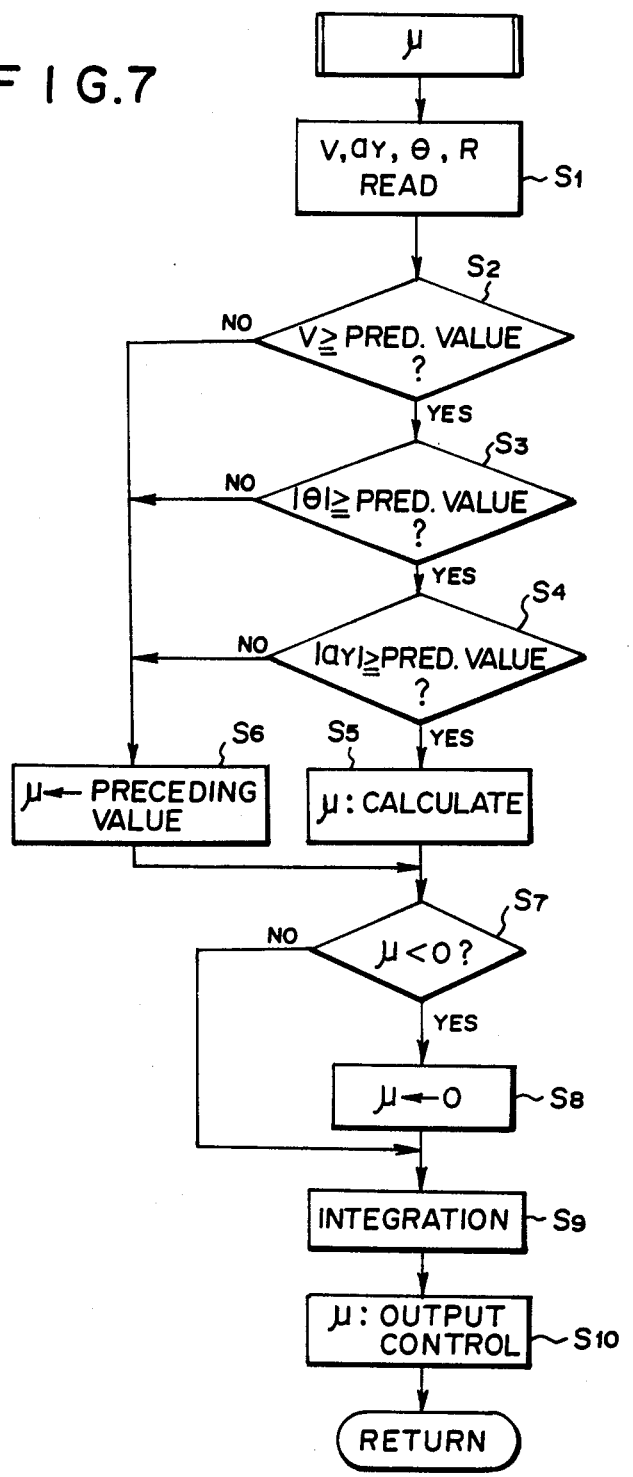
FIG. 7 is a flow chart showing a procedure similar to FIG. 5 but in accordance with still another embodiment of the present invention.

FIG. 7 shows a flow chart for obtaining a frictional coefficient $\mu$ in accordance with still another embodiment of the present invention. The procedure of this embodiment is the same as the first embodiment explained in connection with FIG. 5 except that the frictional coefficient $\mu$ (integrated) is subjected to a certain stabilizing treatment.

Figure 8:
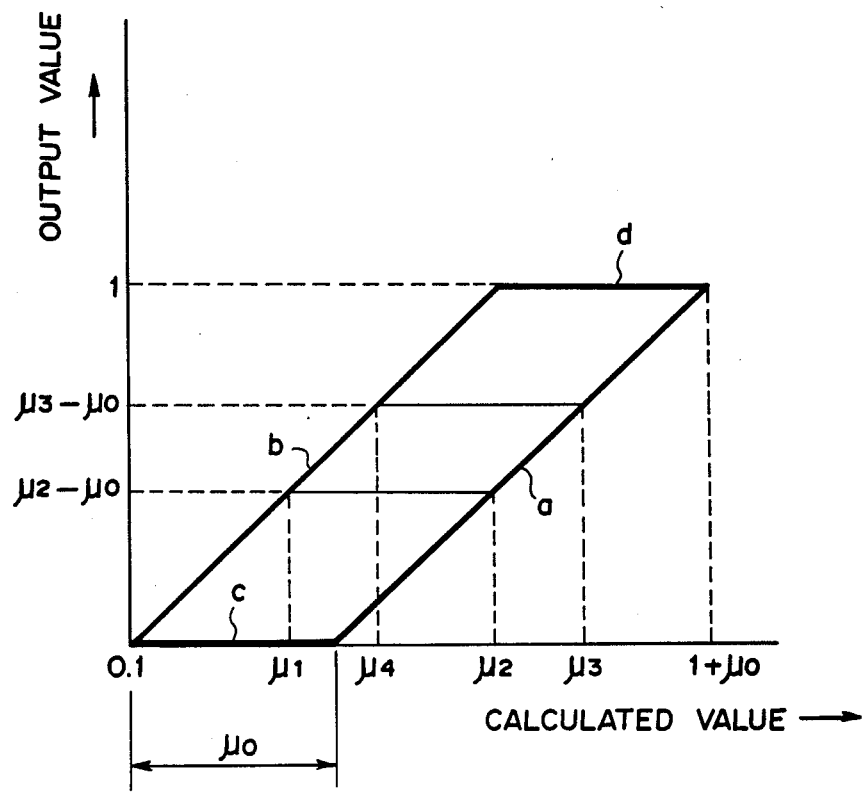
FIG. 8 is a graph showing a method for compensating a value of the frictional coefficient.

In this control, a predetermined range of dead zone $\mu 0$ provided for the frictional coefficient $\mu$. In FIG. 8, when the value of the frictional coefficient $\mu$ is $\mu 1$ in the preceding cycle and the value is increased in the present cycle, the increased value is not greater than a value $\mu 2 = \mu 1 + \mu 0$, the frictional coefficient $\mu$ is deemed as $\mu 1$. When the calculated value $\mu$ is increased beyond the value $\mu 2$, an output signal value $\mu$ which is employed for the steering control and the like begins to change along a line a in FIG. 8. However, the value $\mu$ as the output signal takes a value smaller than an input value or calculated value $\mu$ by $\mu o$. When the calculated value $\mu$ is decreased, an output value is maintained at a constant value until the value $\mu$ is reduced to a value $\mu 4$. And the output value $\mu$ begins to decrease when the value is reduced lower than a value $\mu 4$ for an input value $\mu 3$ wherein the value $\mu 4$ is expressed by $\mu 3 - \mu 0$. Then the frictional coefficient $\mu$ is reduced along a line b in FIG. 8. As a result, the output value of the frictional coefficient $\mu$ can takes a value corresponding to the value of the calculated $\mu$ within an area defined by a base line c which extends from the origin with a constant output value of $\mu$, an increasing line a extending from an end of the base line c, a top line d extending from a top end of the increasing line a and a reducing line b extending from one end of the top line d to the origin which is a point of 0.1 in the illustrated embodiment.

According to the embodiment, the sensors for this control are always subjected to external disturbance during the operation of the vehicle. As a result, the control utilizing the result of the calculation of the frictional coefficient $\mu$ tends to become unstable. However, in the control according to the embodiment, the frictional coefficient $\mu$ is prevented from an abrupt change caused by the external disturbance of the sensors and the like so that an improved control employing the result of the calculation of the frictional coefficient $\mu$ can be obtained. It should be noted that the stabilizing treatment is not necessarily applied to the control together with the integrating treatment of the frictional coefficient $\mu$.

Figure 9A:
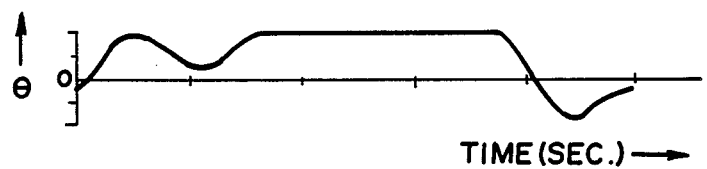
FIG. 9 (a), 9 (b) and 9 (c) are graphs of test results showing changes in steering wheel operation angle and frictional coefficient.
Figure 9B:
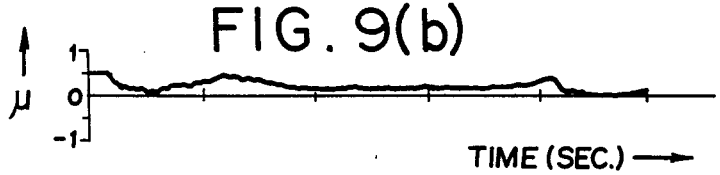
Figure 9C:
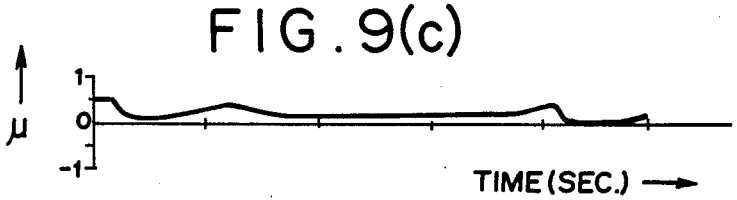

Referring to FIG. 9, there are shown test results of the steering control wherein the control is applied for the four wheel steering vehicle and the side slip angle $\beta$ is deemed as zero. This test is carried out on a road where an average frictional coefficient $\mu$ is speculated to be ranged from 0.2 to 0.3, so called a low frictional coefficient road such as a compressed snowy road.

FIG. 9 (a) shows a relationship between the steering wheel operation angle $\Theta$ and the time. FIG. (b) shows a change in the frictional coefficient $\mu$ which is not subjected to the stabilizing treatment but the integrating treatment. FIG. 9 (c) shows a change in the frictional coefficient $\mu$ which is subjected to both the stabilizing treatment and the integrating treatment. It will be understood from the FIGS. 9 (b) and (c) that when the stabilizing treatment is applied, the vibration of the value can be reduced.

Figure 10:
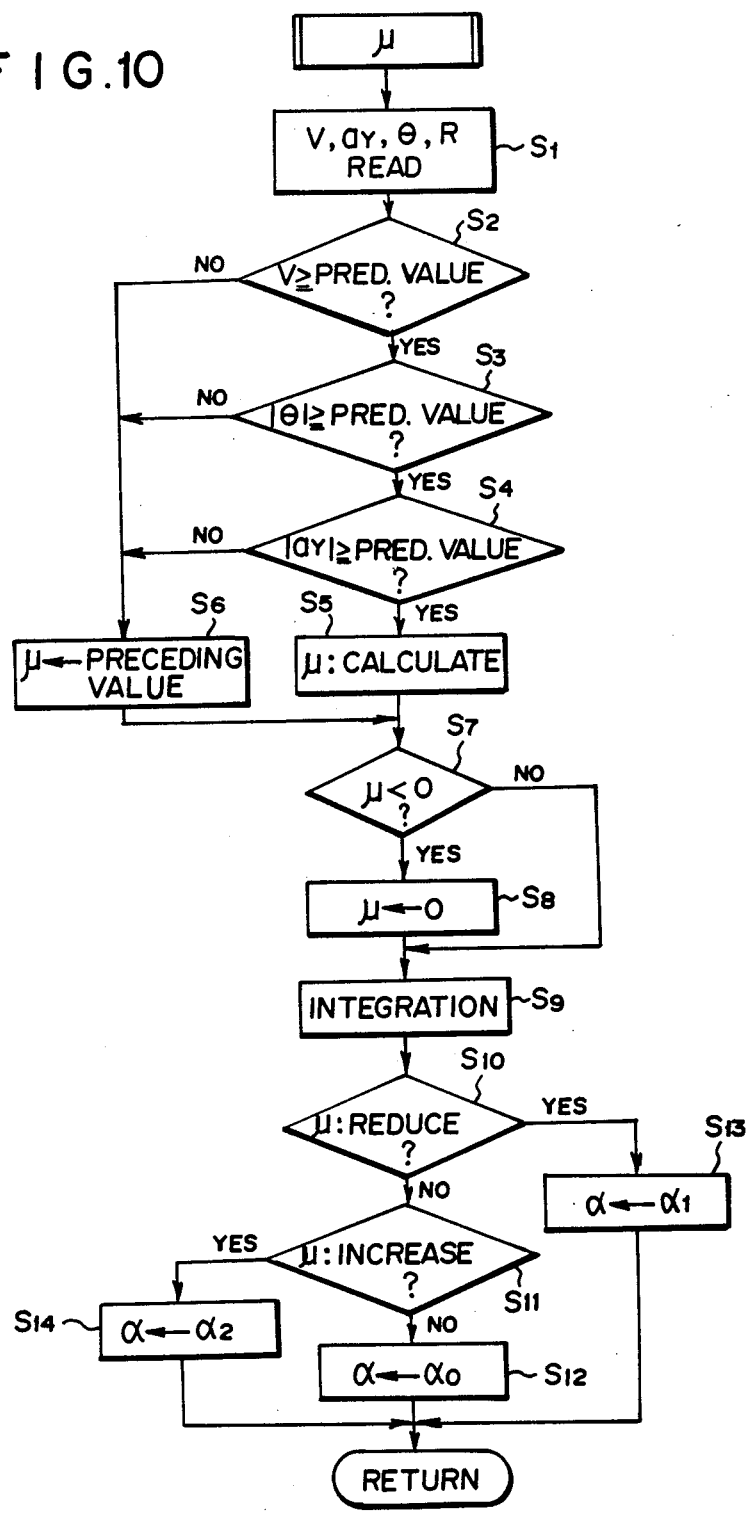
FIG. 10 is a flow chart showing a procedure similar to FIG. 5 but in accordance with yet another embodiment of the present invention.

Referring to FIG. 10, there is shown a control for obtaining the frictional coefficient $\mu$ in accordance with still another embodiment.

This embodiment includes the same steps S1 through S9 as the first embodiment explained in connection with FIG. 5.

In step 10 of FIG. 10, the control unit 21 judges whether or not the frictional coefficient $\mu$ (denoting the integrated value $\mu'$) is reduced. Then the control unit 21 judges whether or not the frictional coefficient $\mu$ is increased in step S11.

If both the judgments are No, the control unit 21 judges the operating condition of the vehicle is normal and provides the constant $\alpha$ with a standard value $\alpha 0$ which is correspondent to the standard time constant $\tau 0$ ($\alpha 0 = 2\tau 0/T$). On the other hand, when the judgment in the step 10 is Yes, in other words, when the frictional coefficient $\mu$ is being reduced, the control unit 21 provides the constant $\alpha$ with a value $\alpha 1$ ($\alpha 1 = 2\tau 1/T$) wherein the time constant $\tau 1$ is smaller than the standard value $\tau 0$ (S13). When the frictional coefficient $\mu$ is being increased, the control unit 21 provides the constant $\alpha$ with a value $\alpha 2$ corresponding to a time constant $\tau 2$ ($\alpha 2 = 2\tau 2/T$) which is greater than the standard value $\tau 0$ (S14).

Thus, according to the present embodiment, when the vehicle is in an operating condition in which the frictional coefficient $\mu$ is changed, the control unit 21 changes the time constant $\tau$ so as to prevent the vehicle from being unstable. In this regard, despite the frictional coefficient $\mu$ is being reduced, if a control for a high frictional coefficient $\mu$ is maintained, the reverse phase control for the rear wheels 3,3 is carried out in a fairy high vehicle speed condition as shown in FIG. 4 so that the steering control will be unstable. According to the present embodiment, when the frictional coefficient $\mu$ is being reduced, the control unit 21 provides the time constant $\tau$ with a smaller value so that the change in the frictional coefficient $\mu$ is responsive. This means that a stable steering control can be accomplished.

When the frictional coefficient $\mu$ obtained through the present embodiment is utilized in an anti-braking system, the above control in which a smaller time constant is set for the reducing condition of the frictional coefficient $\mu$ can provide a desirable effect. This is because a brake lock condition can be successfully avoided as a result that an abrupt increase of a speed difference between the vehicle body and the wheel can be suppressed.

On the other hand, when the frictional coefficient $\mu$ is being increased, the time constant $\tau$ is increased so that an abrupt change in the frictional coefficient $\mu$ is suppressed. Although the operating condition of the vehicle in the increasing frictional coefficient $\mu$ is relatively stable, the above control can further improve the stable control.

Figure 11A:
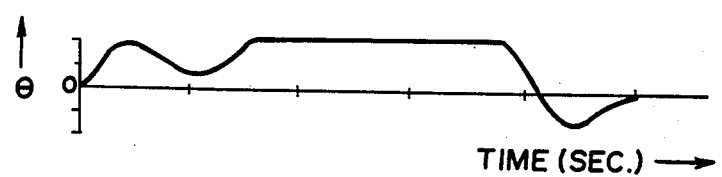
FIG. 11 (a), 11 (b) and 11 (c) are graphs of test results showing changes in steering wheel operation angle and frictional coefficient.
Figure 11B:
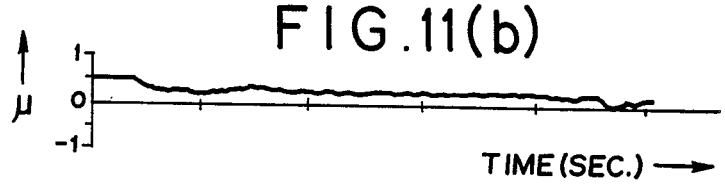
Figure 11C:
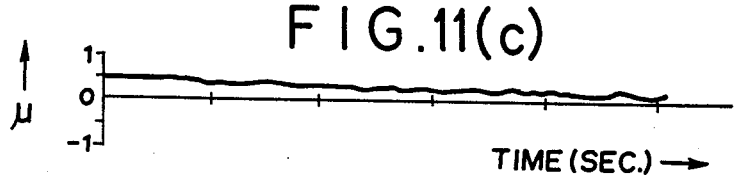

Referring to FIG. 11, there are shown test results of the steering control wherein the control is applied for the four wheel steering vehicle and the side slip angle $\beta$ is deemed as zero. This test is carried out on a road where an average frictional coefficient $\mu$ is speculated to be ranged from 0.2 to 0.3, so called a low frictional coefficient road such as a compressed snowy road.

FIG. 11 (a) shows a relationship between the steering wheel operation angle $\Theta$ and the time. FIG. 11 (b) shows a change in the frictional coefficient $\mu$ which is subjected to the integrating treatment with a small time constant $\tau 1$. FIG. 11 (c) shows a change in the frictional coefficient $\mu$ which is subjected to the integrating treatment with a time constant $\tau 2$ greater than the value $\tau 1$. It will be understood that when the time constant is small, the property of the frictional coefficient $\mu$ is very responsive to the change in the steering wheel operation angle $\Theta$ as shown in FIG. 11 (b), and that when the time constant is large, an stable property of the frictional coefficient $\mu$ can be obtained as shown in FIG. 11 (c).

The time constant $\tau$ may change so as to take a large value as the vehicle speed V is reduced.

Alternatively, the time constant $\tau$ may change so as to take a large value as the steering wheel operation angle $\Theta$ is increased.

Hereinafter, there is described still further embodiment of the present invention.

In this embodiment, the control unit 21 employs the following formulas (18), (19) as well as (1), (8) and (9) for obtaining the frictional coefficient $\mu$.

$$\mu = ma_y/2\{K_F\Theta_F + K_R\Theta_R - (a_Y/V^2)(aK_F - bK_R)\} \quad (18)$$

$$\mu = ma_Y/2\{(K_F + RK_R)(\delta/Z) - (a_Y/V^2)(aK_F - bk_R)\} \quad (19)$$

Wherein a time delay factor $D = 1/(1 + \tau)$, $\delta_F = D\Theta_F$, $\delta_R = D\Theta_R$ and $\delta = D\Theta$.

Referring to FIG. 12, the control unit 21 carries out step S1 through S4 in the same manner as the first embodiment. In step S5, the control unit 21 judges a change in the absolute value of the steering wheel operation angle $\Theta$ is smaller than a predetermined value $\Theta 1$. This judgment is Yes, the control unit 21 judges that the operating condition of the vehicle is normal and calculates the frictional coefficient $\mu$ in accordance with the formula (1), (8) or (9) (S6). On the other hand, the judgment in step S5 is No, the control unit 21 judges that operating condition is in an abrupt cornering operation and calculates the frictional coefficient $\mu$ in accordance with the formula (2), (18) or (19) after obtaining the value $\delta_F$, $\delta_R$ which are provided by steering wheel operation angle $\Theta_F$, $\Theta_R$ for the front and rear wheels respectively taking account of the time delay factor D.

According to the present embodiment, under a specific operating condition of the vehicle wherein the operating condition changes abruptly such as abrupt cornering operation, the time delay factor is applied for the cornering power $K_F$, $K_R$ so that a time delay against the cornering force $F_F$, $F_R$ can be compensated to reduce an error in the calculated value of the frictional coefficient $\mu$. This means that a precise value for the frictional coefficient $\mu$ can be obtained to provide a stable and reliable steering control.

Referring to FIG. 13 through 18, there are shown test results of the steering control wherein the control is applied for the four wheel steering vehicle and the side slip angle $\beta$ is deemed as zero. FIGS. 13 through 16 shows the results where the test is carried out on a road where an average frictional coefficient $\mu$ is speculated to be ranged from 0.2 to 0.3, so called a low frictional coefficient road such as a compressed snowy road.

Figure 13A:
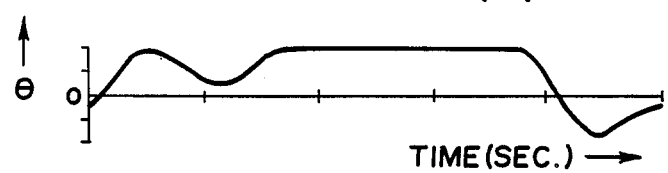
FIGS. 13 (a), 13 (b) through FIGS. 18 (a), 18 (b) are graphs showing test results with regard to steering wheel operation angle, and frictional coefficient.
Figure 13B:
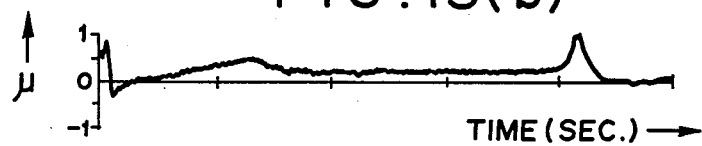
Figure 14A:
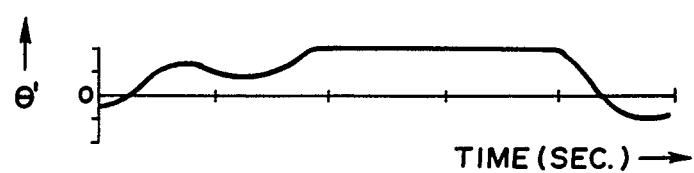
Figure 14B:
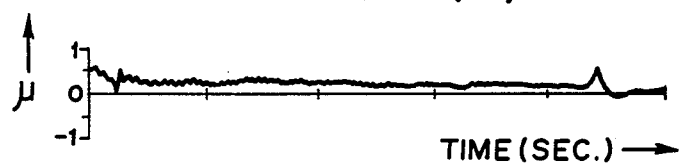
Figure 15A:
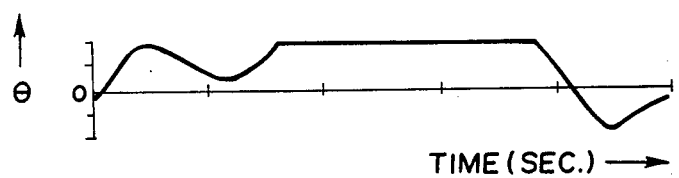
Figure 15B:
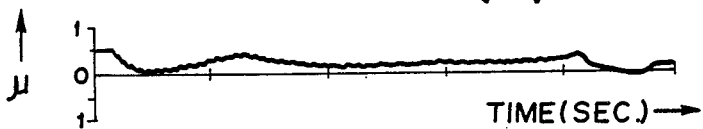
Figure 16A:
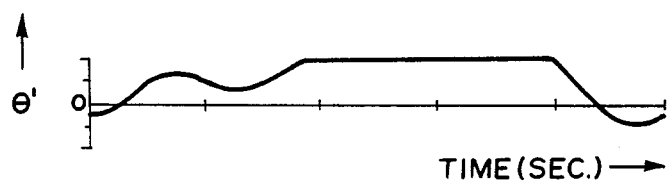
Figure 16B:

FIG. 13 (a) shows a relationship between the steering wheel operation angle $\Theta$ and the time. FIG. 13 (b) shows a change in the frictional coefficient $\mu$ corresponding to the change in the steering wheel operation angle $\Theta$ of FIG. 13 (a). FIG. 14 (a) shows a change in the steering wheel operation angle $\Theta' = D\Theta$ wherein a dynamic property of the wheels are taken into account. FIG. 14(b) shows a change in the frictional coefficient $\mu$ corresponding to the angle $\Theta' = D\Theta$. Comparing FIG. 13 (b) with FIG. 14(b), it will be understood that the property of the change in the frictional coefficient $\mu$ in FIG. 13 (b) is deferred from the property of the steering wheel operation angle $\Theta$ shown in FIG. 13 (a), on the contrary, the property in FIG. 14 (b) exactly matches with the dynamic property of the steering wheel operation angle $\Theta'$ and the change in the property is reduced in comparison with the property of FIG. 13 (b). FIG. 15 (a), (b) shows a relationship between the steering wheel operation angle $\Theta$ and the frictional coefficient $\mu$ similar to FIG. 13. FIG. 16 (a), (b) shows a relationship between the dynamic steering wheel operation angle $\Theta'$ and the frictional coefficient $\mu$. However, in the tests shown in FIGS. 15, 17, the calculation of the frictional coefficient $\mu$ is suspended under a specific operating condition of the vehicle in which an error of the frictional coefficient $\mu$ is undesirably increased.

Figure 17A:
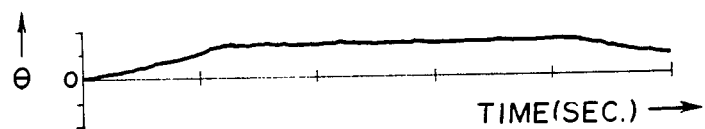
Figure 17B:
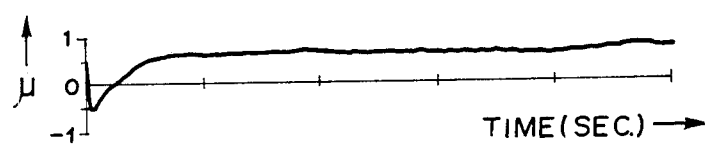
Figure 18A:
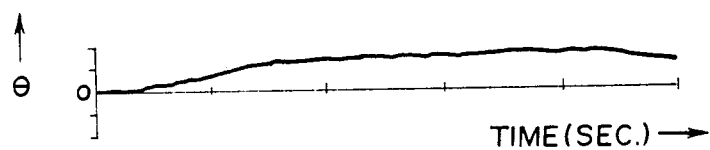
Figure 18B:
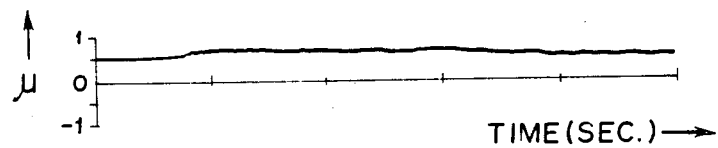

FIGS. 17 and 18 show that the test is carried out on a road where an average frictional coefficient $\mu$ is roughly 0.6 so called a middle frictional coefficient $\mu$ road. In the test shown in FIG. 18, the calculation of the frictional coefficient $\mu$ is suspended and employed the value of the preceding cycle under a specific operating condition of the vehicle wherein the error of the frictional coefficient $\mu$ is unduly increased.

In this test, FIG. 17 (a) shows a property of the steering wheel operation angle $\Theta$ as well as FIG. 13(a) and a small time delay factor D is employed for obtaining the frictional coefficient $\mu$ of FIG. 17 (b). On the other hand, the property of FIG. 18 (a) show a change in a dynamic steering wheel operation angle $\Theta'$. In addition, a large time delay factor D is employed for obtaining the frictional coefficient $\mu$ in FIG. 18 (b). According to the result, the change in the frictional coefficient $\mu$ in FIG. 18 (b) is reduced in comparison with that in FIG. 17(a).

It will be apparent from the above description that although various modifications and variations may be made by those skilled in the art without departing from the spirit of the present invention, all the modifications and the like fall into the claims as attached.

We claim:

1. A vehicle steering control system comprising running condition detecting means for detecting a running condition of a vehicle including a lateral acceleration acting on a gravity center of the vehicle, steering detecting means for detecting steering angle of front and rear wheels of the vehicle, vehicle speed detecting means for detecting a vehicle speed, memory means for storing stability factors of the vehicle including a vehicle weight, respective distances between the gravity center and front and rear axles, cornering powers acting on the front and rear wheels at a standard condition and a yawing moment of inertia, and calculating means for calculating a frictional coefficient $\mu$ of a road surface on which the vehicle is running by employing a following formula:

$$\mu = \frac{[V\{m(a^2K_F+b^2K_R)+IK\}s - mV^2(aK_F-bK_R)]}{a_Y/2cK_FK_R\{V(b\delta_F+a\delta_R)s + V^2(\delta_F-\delta_R) - ca_Y\}} \quad (1)$$

wherein $a_Y$ is the lateral acceleration acting on the gravity center of the vehicle, $\delta_F$ is the steering angle of the front wheels, $\delta_R$ is the steering angle of the rear wheels, V is the vehicle speed, m is the vehicle weight, a is the distance between the gravity center of the vehicle and the front axle, b is the distance between the gravity center of the vehicle and the rear axle, $K_F$, $K_R$ are the cornering powers for the front and rear wheels at the standard condition, I is the yawing moment of inertia of the vehicle, $c=a+b$, $K=K_F+K_R$ and s is a laplacian operator, and control means for controlling the steering angle for the rear wheels in accordance with said frictional coefficient $\mu$ provided by the calculating means.

2. A vehicle steering control system in accordance with claim 1 wherein the improvement further comprises integrating treatment means for applying an integrating treatment to the frictional coefficient $\mu$ provided by the calculating means.

3. A vehicle steering control system in accordance with claim 2 wherein the improvement further comprises means for changing a time constant in accordance with the operating condition of the vehicle, the time constant being employed in the integrating treatment of the frictional coefficient $\mu$.

4. A vehicle steering control system in accordance with claim 1 wherein the improvement comprises suspending means for suspending calculation of the frictional coefficient $\mu$ by the calculating means when the vehicle is in a specific vehicle operating condition in which an error of the frictional coefficient $\mu$ is unduly increased.

5. A vehicle steering control system in accordance with claim 1 wherein the improvement comprises compensating means for providing the frictional coefficient $\mu$ in view of a dead zone of a predetermined range.

6. A vehicle steering control system in accordance with claim 1 wherein the improvement comprises control means for controlling a steering angle for rear wheels of a four wheel steering vehicle in accordance with an output of the calculating means.

7. A vehicle steering control system comprising running condition detecting means for detecting a running condition of a vehicle including a lateral acceleration acting on a gravity center of the vehicle, steering detecting means for detecting steering angle of front and rear wheels of the vehicle, vehicle speed detecting means for detecting a vehicle speed, memory means for storing stability factors of the vehicle including a vehicle weight, respective distances between the gravity center and front and rear axles, cornering powers acting on the front and rear wheels at a standard condition and a yawing moment of inertia, and differentiating means for receiving signals from the running condition detecting means and steering detecting means and calculating differential values of values detected by the running condition detecting means and the steering detecting means, and calculating means for calculating a frictional coefficient $\mu$ of a road surface on which the vehicle is running by employing a following formula:

$$\mu = \frac{[V\{m(a^2K_F+b^2K_R)+IK\}s - mV^2(aK_F-bK_R)]}{a_Y/2cK_FK_R\{V(b\delta_F+a\delta_R)s + V^2(\delta_F-\delta_R) - ca_Y\}} \quad (2)$$

wherein $a_Y$ is the lateral acceleration acting on the gravity center of the vehicle, $\delta_F$ is the steering angle of the front wheels, $\delta_R$ is the steering angle of the rear wheels, V is the vehicle speed, m is the vehicle weight, a is the distance between the gravity center of the vehicle and the front axle, b is the distance between the gravity center of the vehicle and the rear axle, $K_F$, $K_R$ are the cornering powers for the front and rear wheels at the standard condition, I is the yawing moment of inertia of the vehicle, $c=a+b$, $K=K_F+K_R$ and s is a laplacian operator, and control means for controlling the steering angle for the rear wheels in accordance with said frictional coefficient $\mu$.

8. A vehicle steering control system comprising running condition detecting means for detecting a running condition of a vehicle including a lateral acceleration acting on a gravity center of the vehicle, steering detecting means for detecting steering angle of front and rear wheels of the vehicle, vehicle speed detecting means for detecting a vehicle speed, memory means for storing stability factors of the vehicle including a vehicle weight, respective distances between the gravity center and front and rear axles, cornering powers acting on the front and rear wheels at a standard condition and a yawing moment of inertia, differentiating means for receiving signals from the running condition detecting means and steering detecting means and calculating differential values of values detected by the running condition detecting means and the steering detecting means, operating condition detecting means for detecting an operating condition of the vehicle, first calculating means for calculating a frictional coefficient $\mu$ of a road surface on which the vehicle is running by employing a following formula when the operating condition of the vehicle is in a normal condition:

$$\mu = \frac{[V\{m(a^2K_F+b^2K_R)+IK\}s - mV^2(aK_F-bK_R)]}{a_Y/2cK_FK_R\{V(b\delta_F+a\delta_R)s + V^2(\delta_F-\delta_R) - ca_Y\}} \quad (1)$$

and second calculating means for calculating a fractional coefficient $\mu$ of a road surface on which the vehicle is running by employing a following formula when the operating condition of the vehicle is in a specific condition;

$$\mu = \frac{[V\{m(a^2K_F+b^2K_R)+IK\}s - mV^2(aK_F-bK_R)}{a_Y/2cK_FK_R\{V(b\delta_F+a\delta_R)s + V^2(\delta_F-\delta_R) - ca_Y\}} \quad (2)$$

wherein $a_Y$ is the lateral acceleration acting on the gravity center of the vehicle, $\delta_F$ is the steering angle of the front wheels, $\delta_R$ is the steering angle of the rear wheels, V is the vehicle speed, m is the vehicle weight, a is the distance between the gravity center of the vehicle and the front axle, b is the distance between the gravity center of the vehicle and the rear axle, $K_F$, $K_R$ are the cornering powers for the front and rear wheels at the standard condition, I is the yawing moment of inertia of the vehicle, $c=a+b$, $K=K_F+K_R$ and s is a laplacian operator, and control means for controlling the steering angle for the rear wheels in accordance with the frictional coefficient $\mu$ obtained through the above formula (1) or (2).

9. A vehicle steering control system in accordance with claim 8 wherein the operating condition detecting means detects a steering angle of the front wheels or the rear wheels to determine which formula of (1) or (2) is to be used.

10. A vehicle steering control system in accordance with claim 9 wherein the steering angle is not greater than a predetermined value, the frictional coefficient $\mu$ is provided by the second calculating means.

11. A vehicle steering control system in accordance with claim 8 wherein the operating condition detecting means detects the lateral acceleration $a_Y$ to determine which formula of (1) or (2) is to be used.

12. A vehicle steering control system in accordance with claim 11 wherein the frictional coefficient $\mu$ is provided by the second calculating means when the lateral acceleration is not greater than a predetermined value.

13. A vehicle steering control system comprising running condition detecting means for detecting a ruining condition of a vehicle including a lateral acceleration acting on a gravity center of the vehicle, steering detecting means for detecting steering angle of front and rear wheels of the vehicle, vehicle speed detecting means for detecting a vehicle speed, memory means for storing stability factors of the vehicle including a vehicle weight, respective distances between the gravity center and front and rear axles, cornering powers acting on the front and rear wheels at a standard condition and a yawing moment of inertia, compensating means for applying a time delay factor employing a time constant and calculating means for calculating a frictional coefficient $\mu$ of a road surface on which the vehicle is running by employing a following formula:

$$\mu = \frac{[V\{m(a^2K_F+b^2K_R)+IK\}s - mV^2(aK_F-bK_R)]}{a_Y/2cK_FK_R\{V(b\delta_F+a\delta_R)s+V^2(\delta_F-\delta_R)-ca_Y\}} \quad (1)$$

wherein $a_Y$ is the lateral acceleration acting on the gravity center of the vehicle, $\Theta_F$ is the steering angle of the front wheels, $\Theta_R$ is the steering angle of the rear wheels, V is the vehicle speed, m is the vehicle weight, a is the distance between the gravity center of the vehicle and the front axle, b is the distance between the gravity center of the vehicle and the rear axle, $K_F$, $K_R$ are the cornering powers for the front and rear wheels at the standard condition, I is the yawing moment of inertia of the vehicle, $c = a+b$, $K = K_F+K_R$ and s is a laplacian operator, $\delta_F = D\Theta_F$, $\delta_R = D\Theta_R$ $\tau$ is the time constant and $D = 1/(1+\tau s)$, and control means for controlling the steering angle for the rear wheels in accordance with said frictional coefficient $\mu$ obtained through the formula (1).

* * * * *